united States Patent Office 3,397,973
Patented Aug. 20, 1968

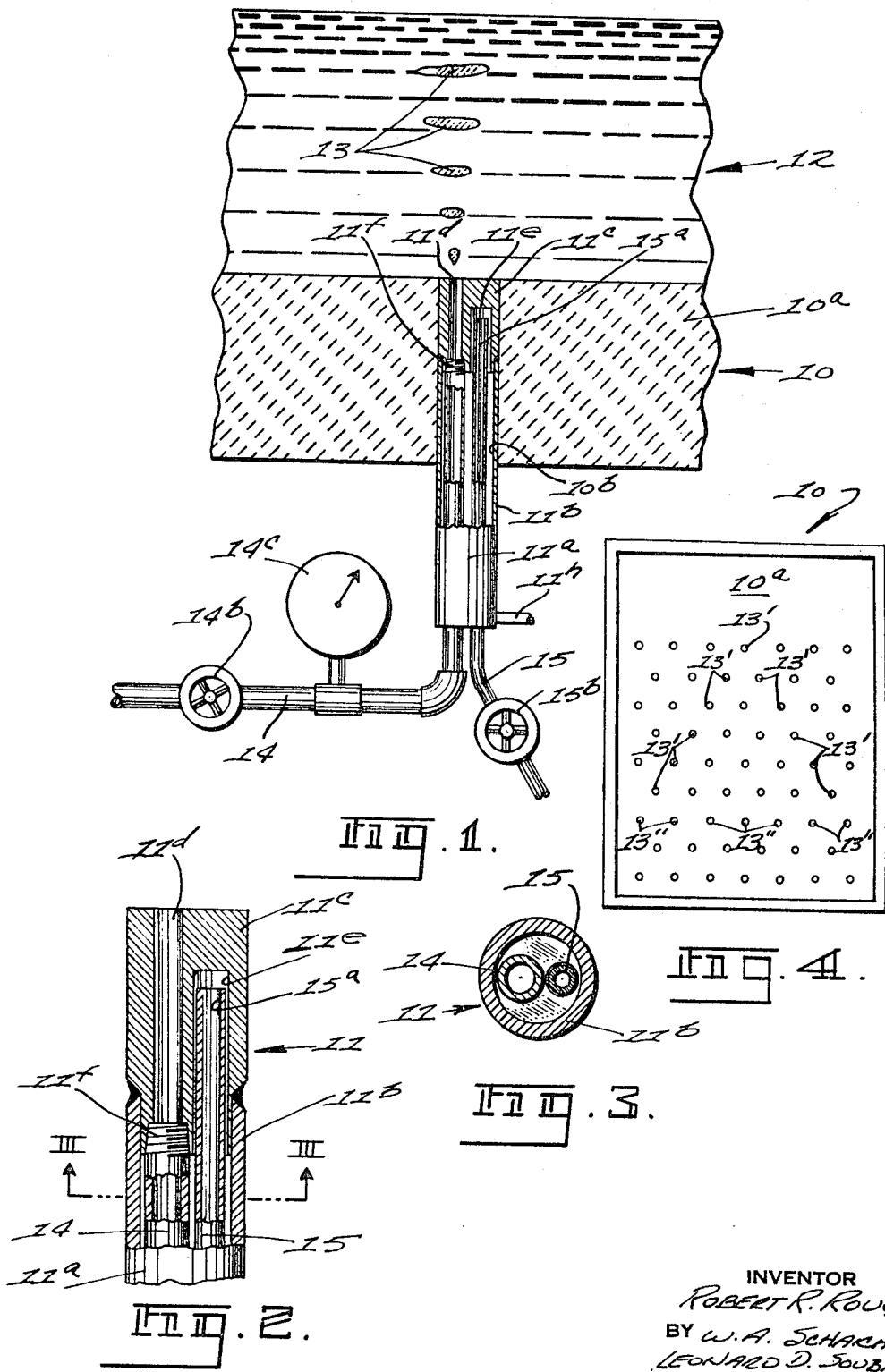

3,397,973
BUBBLER APPARATUS FOR A GLASS
MELTING FURNACE
Robert R. Rough, Toledo, Ohio, assignor to Owens-
Illinois, Inc., a corporation of Ohio
Filed Oct. 23, 1958, Ser. No. 769,211
10 Claims. (Cl. 65—134)

The present invention relates in general to an improvement in bubbler apparatus such as is used for agitating and stirring molten materials and although applicable to various molten materials, relates more particularly, in its preferred embodiment, to a selectively operable bubbler apparatus for introducing a gaseous or gas forming medium into molten glass to effect by a gaseous bubbling action an internal agitation and stirring thereof.

As frequently happens in commercial glass melting operations, when the glass forming batch materials were first melted, the resulting molten mass is permeated to a considerable extent with small entrapped gas bubbles or "seeds," as they are sometimes called in the glass art. These bubbles or "seeds" are believed to occur primarily as the result of air which becomes entrapped in the batch materials and also as the result of decomposition of various materials contained in the glass batch. These gas bubbles or "seeds" give rise to objectionable imperfections in the finished solidified glass and hence must be removed. The necessary removal of these small gas bubbles or "seeds" is quite difficult however. This difficulty is primarily due to the very high viscosity and the resultingly low mobility of the molten mass which retards or prevents the natural rise of the small gas or air bubbles to the surface of the molten glass.

Heretofore, it has been conventional practice in the glass art to accomplish the requisite removal of such glass bubbles or "seeds" by a "fining" procedure which is essentially effected by subjecting the molten glass to elevated temperatures in a "refining" chamber for a considerable period of time; the temperature employed being usually substantially in excess of the desired working temperature for the molten glass. However, even then the molten glass possesses a very high viscosity, and as a result must be maintained at these elevated temperatures for substantial periods of time in order to permit sufficient time for the gas bubbles or "seeds" to gradually work toward the surface of the molten mass and be expelled. Still, the gas or air bubbles or "seeds" are never completely removed, and, as a practical expedient, an optimum time must be established for retaining the molten glass at these elevated temperatures in the "refining" chamber, the optimum time being the result of a compromise determination between the time required for substantial removal of the gas bubbles or "seeds" and the extent of the fining which is required. Obviously, such "fining" procedures as they are called require an undesirable waste of time, heat and fuel. Further, the time required to suitably fine and prepare the glass for the shaping or working operations seriously reduces the rate at which glass might otherwise be produced in a given melting furnace.

Various methods and apparatus for economically expediting these "fining" operations have been employed. Among such methods and apparatus, "bubbler" systems have been utilized quite successfully and have found wide commercial acceptance. Briefly these "bubbler" systems employ a series of bubbler tubes arranged in various patterns usually located along the floor of the melting furnace, and which emit a gas or gas forming medium into the molten glass and glass forming batch materials. The emitted gas or gas forming substance enters the molten glass as a series of small individual bubbles which enter at the bottom of the furnace and expand under the influence of the high furnace and glass temperatures and rise toward the surface of molten glass where the bubbles burst and ordinarily are expelled from the furnace together with the gaseous products of combustion. Incident to the rising movements of these expanding gas bubbles, there is produced an internal agitation and stirring of the molten glass and residual unmelted batch materials which promotes the expulsion of the small entrapped gas bubbles and "seeds." Also, since the heating and melting of the glass is usually accomplished, at least in large part, by heating the surface of the molten glass, the circulation and movement afforded to the molten mass by the bubbler units results in a more uniform temperature gradient throughout the depth of the molten glass. As a result, a greater homogeneity of the glass, a more economical utilization of the heat employed for the melting and refining operations, and an increased furnace melting capacity are ordinarily achieved. Illustrative of one such "bubbler" system is the system disclosed in U.S. Patent No. 2,387,222 issued to J. W. Wright and entitled, "Method of Refining Glass."

It has also been found that a particular placement and/or arrangement of such "bubblers" within the melting furnace frequently gives rise to substantially improved effectiveness. By such placement and arrangement it is possible to establish within the glass controlled patterns of movement of the gas bubbles and consequently of the molten glass itself. However, the particular placement or arrangement of the "bubblers" for the most effective and efficient operation is different in most instances for different melting conditions. For example, it is known that one type of glass may require an altogether different bubbler placement and/or arrangement than another type of glass in order to obtain the best results. Still further, the most desirable placement and arrangement frequently depends upon other operating conditions, such as the melting and refining temperatures employed, the nature of the batch materials, the tonnage requirements of the melting furnace, etc. For example, in certain instances it may be preferable to locate a number of the bubbler units in a straight line path extending transversely across the bottom of the melting or refining chamber so that they are arranged to emit a curtain of bubbles disposed normal to the flow of the molten glass. In other instances an arrangement in which the bubblers are situated in an arcuate path may be preferable. Other various arrangements and patterns of such bubblers are fully disclosed in the copending application of Basil D. Beck, Sr., et al., now issued as U.S. Patent No. 2,909,005, and assigned to the assignee of the present application. To effect such a change in the placement or arrangement of the various bubbler units, however, entails removal, reinsertion, or rearrangement of the individual bubbler units. As a result, considerable time is frequently expended which is accompanied by an excessive amount of labor in order to rearrange the bubbler units into different patterns.

The present invention concerns and has as its objectives, among others, the provision of a bubbler unit which is readily capable of selective or discontinuous operation, and which may be quickly and easily turned on or off such periods of time as may be desirable without necessitating removal of the bubbler unit from the molten material and without causing damage thereto.

Another object of this invention is to provide means whereby several bubbler units may be utilized in different combinations to provide various bubbling patterns and convection currents in the molten material without necessitating a rearrangement of the bubbler units and without requiring the laborious and costly expedient of removing some of the bubbler units from the molten material whenever such a pattern change is desired.

The specific nature of this invention, as well as other objects and advantages thereof, will become apparent to those skilled in the art from the following detailed description, taken in conjunction with the annexed sheet of drawings on which, by way of example only, one preferred embodiment of this invention is illustrated.

On the drawings:

FIG. 1 is a fragmentary section of an elevational view illustrating bubbler means arranged to conduct a gaseous or gas forming medium through the floor of a glass melting furnace into the molten glass, and;

FIG. 2 is an enlarged fragmentary view of the discharge end of the bubbler means shown in FIG. 1, and;

FIG. 3 is a sectional view of the bubbler means taken along the section line 3—3 in FIG. 2, and;

FIG. 4 is a schematic representation in plan view of the floor of a furnace melting chamber in which a group of bubbler units are installed to provide for selective arrangement and distribution of the streams of gaseous bubbles emitted from the bubbler units.

Although the present invention is applicable in its broad aspect to molten materials of various kinds, and such applicability is fully appreciated, for purposes of description the present invention will be hereinafter described in accordance with a preferred embodiment depicting the invention as it relates to a glass melting furnace.

Referring first to FIG. 1 of the drawings, there is schematically shown a portion of a conventional glass furnace melting, or conditioning chamber 10 or the like, in which there is contained a body of molten glass 12. Extending vertically through the floor 10$^a$ of the chamber 10, which is preferably constructed from a suitable high temperature refractory material, there is an opening 10$^b$ in which there is situated a bubbler unit 11 in contact with the molten glass 12. The bubbler unit 11 is operative to transfer a gaseous or gas forming medium from a suitable source of supply into the lower regions of the molten glass 12 and preferably in the vicinity of the furnace floor 10$^a$. In this respect, the operation of the bubbler unit 11 is standard and emits the gaseous or gas forming medium into the stream of molten glass 12 in the form of gaseous bubbles 13 which gradually expand in size, as illustrated, under the effect of the elevated temperatures of the furnace and molten glass 12. The expanding bubbles rise toward the surface of the molten glass and produce currents in the glass together with an internal stirring and agitation thereof. Upon reaching the upper surface of the molten glass 12 the greatly expanded gas bubbles burst and are discharged from the furnace together with the furnace stack gases, other gases of combustion, etc., or, if desired, are recovered by suitable recovery processes for further utilization.

In accordance with the present invention, the bubbler unit 11, which is preferably fabricated from stainless steel tubing or other similar high temperature, corrosion resistant material, comprises a housing 11$^a$ having a hollow lower end portion 11$^b$ and a plugged upper end portion 11$^c$. The plugged upper end portion 11$^c$ of the housing 11$^a$ defines a conduit 11$^d$ extending in a lengthwise direction of the housing 11$^a$. The conduit 11$^d$ is open at both ends and communicates at its lower end with a supply pipe 14 which supplies the gaseous or gas forming medium to the interior of housing 11$^a$, and at its upper end with the body of molten glass 12. The wall of conduit 11$^d$ is preferably threaded, as at 11$^f$, or otherwise tightly connected or sealed to the discharge end 14$^a$ of the supply pipe 14 to prevent leakage therebetween.

As indicated previously, it frequently becomes desirable to discontinue the introduction of bubbles into the molten glass either entirely, or at specific bubbler unit locations, as melting and operating conditions may dictate. To this tion 11$^c$ of the housing 11$^a$ of the respective bubbler units heretofore employed, means are provided for permitting each bubbler unit 11 to be selectively operated without requiring removal of the bubbler unit from its operative position, and without occasioning an impairment thereof as a result of non-operation of the bubbler unit while in such position. As illustrated, the plugged upper end portion 11$^c$ of the housing 11$^a$ of the respective bubbler units tion 11$^c$ of the housing 11$^a$ of the respective bubbler units defines a cooling compartment 11$^e$ which is located adjacent to the conduit 11$^d$ and which communicates at its lower end with the hollow lower end portion 11$^b$ and which extends into the plugged end portion 11$^c$ to terminate slightly below the uppermost or glass contacting end of the bubbler unit. A coolant supply pipe 15, which may be connected to carry a suitable coolant, such as for example air, water, or other suitable cooling medium, extends lengthwise of the hollow lower end portion 11$^b$ and has a coolant discharge end 15$^a$ axially disposed within the cooling compartment 11$^e$. As best illustrated in FIG. 2 the size of the cooling compartment 11$^e$ is such that the coolant supply pipe 15 may be inserted therein and extend to a position wherein its discharge end 15$^a$ is closely spaced from the closed terminal end of the cooling compartment. Likewise, the relative size of the cooling compartment 11$^e$ and the coolant supply pipe 15 is such that a small annular opening is afforded between the wall of the cooling compartment 11$^e$ and the exterior surface of the coolant supply pipe 15 which permits restricted flow of the coolant downward around the exterior surface of the coolant supply pipe into the lower end 11$^b$ of the housing 11$^a$ from where the coolant may be suitably discharged, as through the discharge pipe 11$^h$.

Regulation and control of the gaseous or gas forming medium and the coolant is afforded to each bubbler unit 11 by suitable and conventional control valves 14$^b$ and 15$^b$ respectively disposed in the gas and coolant supply pipes 14 and 15, and which may be of the manually operated type, as illustrated, or of a suitable automatic type. Additional visual regulation of the gaseous or gas forming medium may be afforded by a conventional gas pressure indicator 14$^c$ installed in the gas supply pipe 14 at a location between the manual control valve 14$^b$ and the discharge end 14$^a$.

As illustrated in FIG. 1, the operation of the bubbler unit 11 is such that a gaseous or gas forming medium supplied through the gas supply pipe 14 will be discharged through the gas conduit 11$^d$ and, as discharged, form a series of small bubbles 13 which gradually expand as a result of the elevated temperatures and rise toward the surface of the molten glass 12. The upward movement and expansion of the individual gas bubbles 13 produce an internal stirring and agitation within the body of molten glass 12 and such other melted and unmelted vitrescent materials as may be contained therein, as fully explained in U.S. Patent No. 2,387,222 and U.S. Patent No. 2,909,005, previously referred to.

During ordinary operation of the bubbler unit 11, the gas supply pipe control valve 14$^b$ and the coolant supply pipe control valve 15$^b$ are both in an open position. The rate at which the gas bubbles are admitted to the molten glass 12, and the size of the gas bubbles so admitted are controlled by the manual control valve 14$^b$ and the pressure regulator 14$^c$, the gas pressure obviously always being maintained in excess of the counterpressure exerted by the head of molten glass 12. The coolant is supplied from supply pipe 15 and circulated through the cooling compartment 11$^e$ at a rate sufficient to preclude excessive thermal deterioration of the bubbler unit 11, but at a rate which is insufficient to effect solidification of the molten glass 12 overlying the upper end portion 11$^c$ of the bubbler unit 11. Obviously, the rates and pressures employed for the gaseous or gas forming medium and the coolant will vary and be dependent upon furnace, glass, and various other operating conditions. Thus, when it is desired to entirely prevent the admission of gas bubbles 13 into the molten glass 12, or to vary the particular arrangement or geometric pattern of several such bubbler units 11; for example, as illustrated in FIG. 4 where several bubbler units are shown oriented in spaced grid-like array, from a V-shaped pattern provided by bubbler units 13′ to a straight line pattern corresponding to the position of bubbler units 13″, certain selected ones of the bubbler units are selectively turned off and rendered inoperative. Thus, the particular geometric pattern or arrangement desired may be quickly and easily obtained. Obviously, the two patterns illustrated in FIG. 4 are merely exemplary of a great many positions, patterns and arrangements which are obtainable.

To accomplish such selective operation, the manual control valve 14$^b$ on each bubbler unit which is to be rendered inoperative is closed and the manual control valve 15$^b$ retained in an open position to supply coolant to the plugged end portion 11$^c$ of housing 11$^a$. As a result of cessation of the flow of the gaseous or gas forming medium, the molten glass will flow into the open end of the conduit 11$^d$ and be chilled or frozen to a non-flowable condition by the coolant circulating through the cooling compartment 11$^e$ and cooling the walls of the conduit 11$^d$. The cooling effect achieved by the emergence of the coolant from the coolant supply pipe 15 effects a substantial increase in the viscosity of the molten glass 12 and prevents same from flowing more than a slight distance into the conduit 11$^d$. The distance which the molten material is permitted to flow into the conduit 11$^d$ may vary somewhat and proper results should be obtained so long as the amount of such flow into the conduit does not exceed an amount which the heat from the furnace is capable of restorting to a molten condition when the coolant is turned off. Obviously, the smaller the amount of the material and the smaller the distance of flow into the conduit the easier it will be to remelt the material within the conduit when operation of the bubbler unit is to be recommenced. It should also be noted that the circulation of the coolant prevents excessive thermal deterioration or decomposition of the bubbler unit in addition to cooling the molten material within the conduit 11$^d$.

When it is desired to recommence operation of the bubbler unit 11, the manual control valve 15$^b$ in the coolant supply pipe 15 is preferably closed and the manual control valve 14$^b$ in the gas supply pipe 14 opened. Thereupon, the heat transmitted from the furnace and the molten glass 12 overlying the bubbler unit 11 soften the chilled or solidified glass contained within the conduit 11$^d$, and the pressure of the gas being supplied through the conduit 11$^d$ forces the heat-softened glass to move back into the main body of molten glass 12 in the furnace 10. Thus, the bubbling action is recommenced. After the removal of the glass from the conduit 11$^d$, the coolant control valve 15$^b$ may be reopened to effect cooling and protection of the bubbler unit 11.

Alternatively, the cooling effected by circulation of coolant through the coolant compartment 11$^e$ may be increased sufficiently to form a film of chilled glass over the exterior surface of the discharge end of the conduit 11$^d$ and gas pressure to the orifice at the end of conduit 11$^d$ reduced so that the film is impervious to the formation of bubbles by issuing gas from the conduit. In such event, the gas control valve 14$^b$ obviously need not be closed and the bubbler unit can be selectively operated by regulation of the coolant valve alone.

By virtue of the construction described above, it is possible to operate the bubbler unit intermittently when such type operation is desired and to thereby effect a substantial savings in the amount of the gaseous or gas forming medium utilized for the bubbler action. Additionally, a greater control of the melting conditions and quality of the molten glass is obtainable as a result of the great variability of bubbler positions, geometric patterns and arrangements which may be achieved without necessitating removal or rearrangement of the individual bubbler units.

It will, of course, be understood that various details of construction may be modified through a wide range without departing from the principles of this invention, and it is not, therefore, the purpose to limit the patent granted hereon otherwise than necessitated by the scope of the appended claims.

I claim:
1. The method of glass melting furnace operation which comprises, introducing streams of gaseous fluid into a pool of molten glass in such a furnace via tubes projected through the bottom thereof to a region above the bottom level of the pool, and directing gaseous cooling fluid to the region surrounding the upper ends of such tubes to freeze any molten glass entering them whenever the passage of such streams into the molten glass is discontinued and thus restrict the downward flow of molten glass thereinto to a level above the furnace bottom.

2. The method of glass melting furnace operation which comprises, introducing a stream of gaseous fluid into a pool of molten glass in such a furnace, which includes a bottom wall, via a tube projected through an aperture in said bottom wall thereof and its upper end being in contact with the glass at the bottom portion of the pool, and directing cooling fluid to the region surrounding the upper end of such tube to freeze any molten glass entering it whenever the passage of such stream into the molten glass is discontinued and thus restrict the downward flow of molten glass thereinto.

3. The method of glass melting furnace operation which comprises, introducing streams of gaseous fluid into a pool of molten glass in such a furnace via tubes projected through the bottom thereof, and directing cooling fluid to the region at the upper ends of such tubes to freeze any molten glass entering them whenever the passage of such streams into the molten glass is discontinued and thus restrict the downward flow of molten glass thereinto.

4. In a method of bubbling a gaseous medium through a viscous molten mass by positioning in spaced grid-like orientation beneath the surface of said molten mass a plurality of means respectively having a discharge orifice for introducing separate streams of gaseous bubbles into said molten material, the steps of reducing the pressure of said gas at the discharge orifice of certain selected ones of said means, and temporarily cooling the portion of the molten mass located at the discharge orifice of said certain selected ones of said means to a non-flowable condition, to thereby selectively vary the relative arrangement of said streams of bubbles through said molten mass.

5. In a method of bubbling a gaseous medium through a viscous molten mass by positioning in spaced grid-like orientation beneath the surface of said molten mass a plurality of means respectively having a discharge orifice for introducing separate streams of gaseous bubbles into said molten material, the steps of alternately cooling and reheating the portion of the molten mass located at the discharge orifice of certain selected ones of said means to a non-flowable condition to interrupt the introduction of the stream of gaseous bubbles therefrom, to thereby selectively vary the relative arrangement of said streams of bubbles through said molten mass.

6. In a method of bubbling a gaseous medium through a viscous molten mass by positioning means for introducing a stream of gaseous bubbles into said molten material, the step of selectively operating said means which comprises selectively cooling the portion of said molten mass located at the point of emergence of said bubbles from said means to a non-flowable condition and subsequently reducing said cooling sufficiently to restore said non-flowable portion to a molten condition.

7. In a method of bubbling a gaseous medium through a viscous molten mass by positioning in said molten mass means for emitting a stream of gaseous bubbles, the step of selectively operating said means which comprises selectively cooling the portion of said molten mass located at the point of emergence of said bubbles from said means sufficiently to render same impervious to the introduction of said bubbles and subsequently reheating said cooled portion sufficiently to restore same to a molten condition.

8. In a method of bubbling a gaseous medium through a viscous molten mass by positioning in said molten mass means for emitting a stream of gaseous bubbles, the step of selectively operating said means by temporarily freezing the portion of said molten mass located at the point of emergence of said bubbles from said means.

9. In a method of bubbling a gaseous medium through a viscous molten mass by positioning in spaced grid-like orientation beneath the surface of said molten mass a plurality of means respectively having a discharge orifice for emitting separate streams of gaseous bubbles into said said molten material, the steps of cooling portions of the molten mass located only at the discharge orifice of certain selected ones of said means to a non-flowable condition to prevent the emission of gaseous bubbles therefrom, an subsequently increasing the temperature of certain selected non-flowable portions sufficiently to return same to a molten condition, to thereby selectively vary the relative arrangement of said streams of gaseous bubbles through said molten mass.

10. A bubbling means for use in a glass furnace chamber containing viscous molten glass, said glass chamber being defined by plural adjoining walls and a bottom wall, the bottom wall having an aperture therein below the surface of the molten glass, said bubbling means comprising a housing wall forming a heat transfer chamber disposed in and sealing said aperture, a first conduit within in said heat transfer chamber, a second conduit within said heat transfer chamber and having an open end defining a bubbler orifice, means for supplying a gaseous medium at variable pressure to said second conduit, said bubbler orifice directing the gaseous medium into the molten glass, said first conduit having an outlet in proximity to said bubbler orifice, a coolant supply means connected to the first conduit, and valve means in said first conduit for selectively regulating the flow of coolant to said first conduit outlet, whereby the viscosity of the molten glass adjacent said bubbler orifice is selectively increased to limit entry of molten glass into said bubbler orifice.

References Cited

UNITED STATES PATENTS

| | | | |
|---|---|---|---|
| 2,313,226 | 3/1943 | Daun | 62—394 |
| 2,572,555 | 10/1951 | Young et al. | 62—293 |
| 2,884,744 | 5/1959 | Monks et al. | 138—197 |
| 2,636,914 | 4/1953 | Arbeit | 49—54 |

FOREIGN PATENTS

| | | |
|---|---|---|
| 134,393 | 10/1947 | Australia. |
| 114,862 | 7/1957 | France. |
| 611,401 | 10/1948 | Great Britain. |
| 658,151 | 10/1951 | Great Britain. |
| 794,292 | 4/1958 | Great Britain. |

DONALL H. SYLVESTER, *Primary Examiner.*

J. W. MIGA, *Assistant Examiner.*

UNITED STATES PATENT OFFICE
CERTIFICATE OF CORRECTION

Patent No. 3,397,973                                  August 20, 1968

Robert R. Rough

It is certified that error appears in the above identified patent and that said Letters Patent are hereby corrected as shown below:

Column 3, line 71, "tion $11^c$ of the housing $11^a$ of the respective" should read -- end and in contrast with previous types of --.

Signed and sealed this 20th day of January 1970.

(SEAL)
Attest:

Edward M. Fletcher, Jr.

Attesting Officer

WILLIAM E. SCHUYLER, JR.
                                                          Commissioner of Patents